United States Patent
Shimodaira et al.

Patent Number: 5,280,587
Date of Patent: Jan. 18, 1994

[54] COMPUTER SYSTEM IN WHICH A BUS CONTROLLER VARIES DATA TRANSFER RATE OVER A BUS BASED ON A VALUE OF A SUBSET OF ADDRESS BITS AND ON A STORED VALUE

[75] Inventors: Ataru Shimodaira, Phoenix; Walter H. Potts, Tempe, both of Ariz.

[73] Assignee: VLSI Technology, Inc., San Jose, Calif.

[21] Appl. No.: 860,962

[22] Filed: Mar. 31, 1992

[51] Int. Cl.$^5$ .................................................. G06F 13/00
[52] U.S. Cl. ........................ 395/275; 395/325;
395/550; 364/DIG. 1; 364/231.5; 364/236.2;
364/238; 364/239.1; 364/240; 364/240.5;
364/242.3; 364/242.6; 364/242.7; 364/247.2;
364/254.9; 364/260; 364/260.1; 364/270;
364/270.2; 364/271.6
[58] Field of Search ............... 395/275, 325, 250, 425, 395/550

[56] References Cited
U.S. PATENT DOCUMENTS

| | | |
|---|---|---|
| 4,095,265 | 6/1978 | Urba .................................. 395/425 |
| 4,217,637 | 8/1980 | Faulkner et al. ................. 395/550 |
| 4,476,527 | 10/1984 | Clayton, IV ..................... 395/275 |
| 4,486,833 | 12/1984 | Daudelin ........................... 395/275 |
| 4,494,196 | 1/1985 | Greer .................................. 395/275 |
| 4,507,732 | 3/1985 | Catiller et al. ................... 395/275 |
| 4,571,674 | 2/1986 | Hartung ............................. 395/250 |
| 4,607,348 | 8/1986 | Sheth ................................. 395/275 |
| 4,644,463 | 2/1987 | Hotchkin et al. ................ 395/250 |
| 4,860,193 | 8/1989 | Bentley et al. .................. 395/250 |

*Primary Examiner*—Michael R. Fleming
*Assistant Examiner*—Ayaz R. Sheikh
*Attorney, Agent, or Firm*—Douglas L. Weller

[57] ABSTRACT

A computer system includes a bus and a plurality of devices coupled to the bus. A CPU within the bus controller generates addresses for data transfers to and from the devices. A bus controller generates control signals for the data transfers. A data transfer rate controlled by the control signals is varied so that the data transfer rate is optimal for data transfers to and from each device. The data transfer rate for a data transfer to or from a first device is based on a subset of address bits used by the CPU to address the first device.

9 Claims, 2 Drawing Sheets

COMPUTER SYSTEM IN WHICH A BUS CONTROLLER VARIES DATA TRANSFER RATE OVER A BUS BASED ON A VALUE OF A SUBSET OF ADDRESS BITS AND ON A STORED VALUE

BACKGROUND

The present invention concerns a bus controller which dynamically changes timing for data transfers on the bus.

In a computer system, peripheral devices are generally connected to the computer system via a peripheral bus. A computer system may use a separate peripheral processor to communicate with peripheral devices on the peripheral bus.

A bus clock signal is generated to control the speed of data transfer on the bus. For example, a peripheral processor may generate the bus clock signal. However, not all peripheral devices are able to transfer data at the same rate. Therefore, to insure proper operation of the computer system, the peripheral processor must transfer data at a rate acceptable to all peripheral devices on the bus.

SUMMARY OF THE INVENTION

In accordance with the preferred embodiment of the present invention, a computer system is presented which includes a bus and a plurality of devices coupled to the bus. A CPU within the bus controller generates addresses for data transfers to and from the devices. A bus controller generates control signals for the data transfers. A data transfer rate controlled by the control signals is varied so that the data transfer rate is optimal for data transfers to and from each device. The data transfer rate for a data transfer to or from a first device is based on a subset of address bits used by the CPU to address the first device.

In the preferred embodiment of the invention, DMA data transfers may also be performed. For example, the DMA data transfers may be in a first DMA channel. Control signals for the DMA transfers are generated by the bus controller. A first data transfer rate for the DMA data transfers in the first DMA channel is based on a first stored value, stored, for example, in a configuration register. For DMA data transfers in a second DMA channel, a second data transfer rate is based on a second stored value, also stored, for example, in the configuration register. In the preferred embodiment of the present invention, data transfer rate is varied by varying the number of clock cycles per data transfer.

DESCRIPTION OF THE PREFERRED EMBODIMENT

Figure 1:
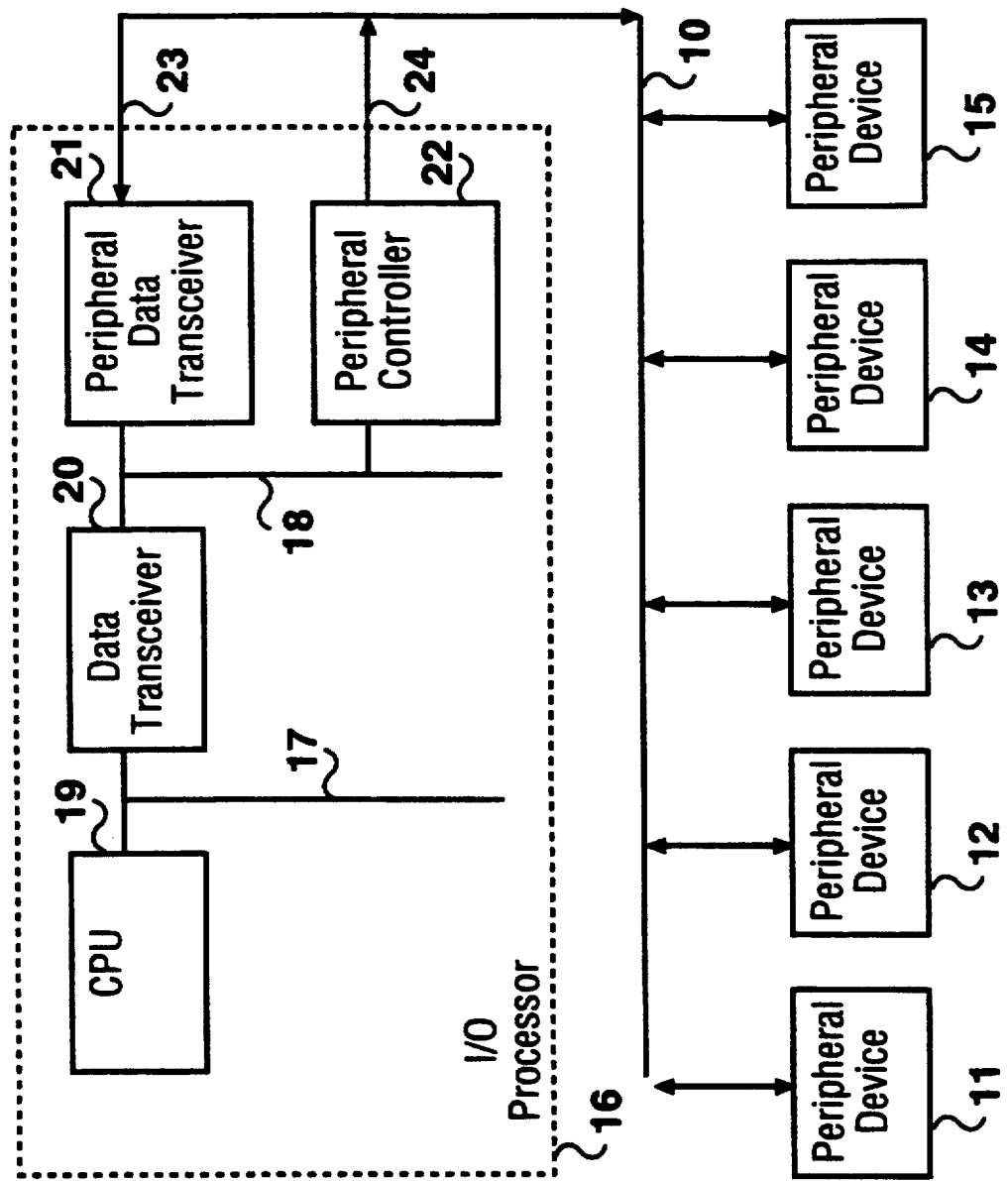
FIG. 1 shows a simplified block diagram of devices connected to a peripheral bus in accordance with the preferred embodiment of the present invention.

In FIG. 1 a peripheral bus 10 is shown. Connected to peripheral bus 10 are a peripheral device 11, a peripheral device 12, a peripheral device 13, a peripheral device 14 and a peripheral device 15. Each of peripheral devices 11-14 may be, for example, an EEPROM, a hard disk controller, a floppy disk controller or a local area net (LAN) controller. Also connected to peripheral bus 10 is an input/output (I/O) processor 16. I/O processor 16 is composed of numerous logic blocks. For example, FIG. 1 shows I/O processor 16 to include a central processing unit (CPU) 19, a data transceiver 20, a peripheral data transceiver 21 and a peripheral controller 22. Data transceiver 20 is connected to CPU 19 by a local bus 17. Data transceiver 20 is connected to peripheral data transceiver 21 and peripheral controller 22 through a remote bus 18. Peripheral data transceiver 23 is connected to peripheral bus 10 through data lines 23. Peripheral controller 22 is connected to peripheral bus 10 through control lines 24.

Figure 2:
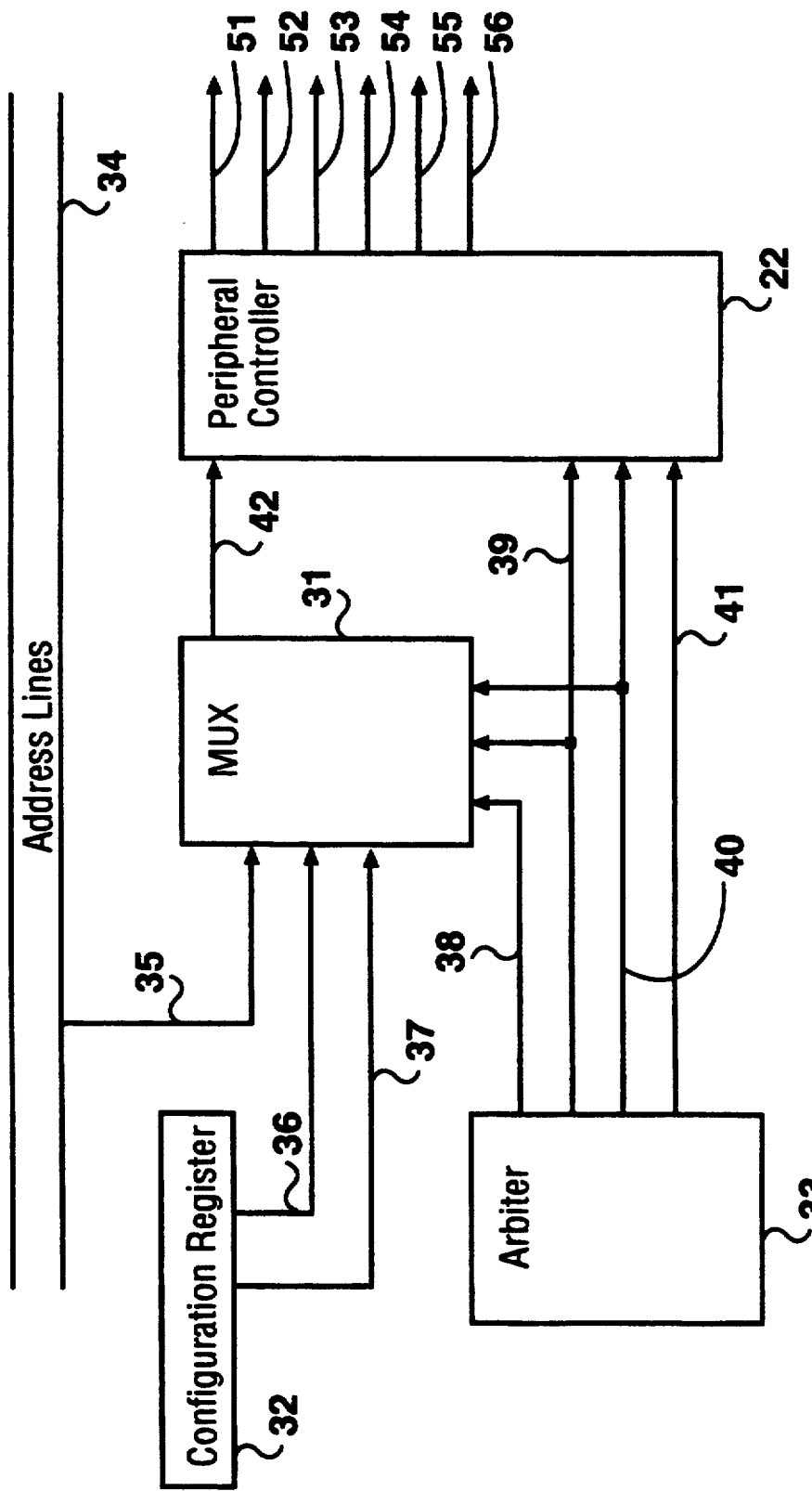
FIG. 2 shows a simplified block diagram of an input-/output processor connected to the peripheral bus shown in FIG. 1 in accordance with the preferred embodiment of the present invention.

FIG. 2 shows additional detail of logic blocks within I/O processor 16. For example, FIG. 2 shows that control lines 24 of peripheral controller 22 include a peripheral cycle line 51, a peripheral I/O read line 52, a peripheral I/O write line 53, a peripheral data acknowledge line 54, a peripheral clock line 55 and a peripheral chip select line 56.

Different peripherals are able to transfer data at different rates. For example, at a clock frequency of 50 MHz, four clock cycles per data transfer may be used to transfer 12.5 megabytes of data per second between I/O processor 16 and an eight-bit EEPROM. At the same clock frequency, twelve clock cycles per data transfer may be used to transfer 8.32 megabytes of data per second between I/O processor 16 and a sixteen-bit hard disk controller. At the same clock frequency, nine clock cycles per data transfer may be used to transfer 11.1 megabytes of data per second between I/O processor 16 and a sixteen-bit floppy disk controller. At the same clock frequency, six clock cycles per data transfer may be used to transfer 18.75 megabytes of data transfer per second between I/O processor 16 and an eight-bit LAN controller.

In order for peripheral controller 22 to transfer data at an appropriate rate, peripheral controller 22 receives an encoded bus speed from a multiplexor 31 over lines 42. For example, lines 42 may include two bits of data which indicate one of four different data transfer rates. In the preferred embodiment, the different data transfer rates are varied by varying the number of clock cycles utilized per data transfer. The clock frequency is not varied.

Multiplexor 31 selects data from either lines 35, lines 36 or lines 37 to be forwarded to lines 42. Lines 35 carry data from two bits of address lines 34. Address lines 34 are the address lines for local bus 17. Address lines 34 contain, for example, 26 address lines, providing for an address space of 64 megabytes for CPU 19. Twenty megabytes of the address space ($2000000_H$ to $33FFFFF_H$) are divided into five blocks. Each of the five blocks addresses four megabytes. Each block of four megabytes is used to address one of peripheral devices 11 through 15.

Each of the four megabyte blocks of the address space is further broken down into four one megabyte sub-blocks of address space. Each one megabyte sub-block represents a different peripheral speed. Thus the peripheral speeds are encoded into two address bits of the address on address lines 4. The two address bits into which the peripheral speeds are encoded are placed on lines 35.

When direct memory access (DMA) is used for data transfers to or from peripheral devices 11 through 15, the number of clock cycles per data transfer is chosen based on values within a configuration register 32. Data on lines 36 come from two bits of data in configuration register 32. These two bits of data in configuration register 32 encode a data transfer rate for a first DMA channel. Data on lines 37 come from two additional bits of data in configuration register 32. These two additional bits of data in configuration register 32 encode a data transfer for a second DMA channel.

Multiplexor 31 selects data on one of lines 35, 36 and 37 based on input from an arbiter 33. When arbiter 33 asserts a signal on a line 38, multiplexor 33 forwards encoded data on lines 35 to lines 42. When arbiter 33 asserts a signal on a line 39 multiplexor 33 forwards encoded data on lines 36 to lines 42. When arbiter 33 asserts a signal on a line 40, multiplexor 33 forwards encoded data on lines 37 to lines 42. Data on lines 40 and 41, as well as a peripheral bus cycle signal on a line 41, are also directly forwarded to peripheral controller 22.

Peripheral controller 22 decodes the encoded data on lines 42. Based on the encoded data on lines 42, peripheral controller 22 generates control signals so that data is transferred at the appropriate rate. Table 1 below gives an example of clock cycles per data transfer, as controlled by peripheral controller 22.

TABLE 1

| First Encoded Bit | Second Encoded Bit | Clock cycles per Data Transfer |
|---|---|---|
| 0 | 0 | 4 |
| 0 | 1 | 6 |
| 1 | 0 | 9 |
| 1 | 1 | 12 |

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computer system comprising:
    a bus;
    a plurality of devices connected to the bus, each of the plurality of devices for receiving and transmitting data over the bus at one of a plurality of data transfer rates; and,
    a bus controller, connected to the bus, the bus controller including;
        a central processing unit, which generates addresses identifying one of the plurality of devices for a data transfer,
        address lines, connected to the central processing unit, which receives address bits generated by the central processing unit, a first data transfer rate being encoded on a first set of the address lines,
        a storage device for storing a first stored value which indicates a second data transfer rate,
        selection means, having a first input connected to the first set of the address lines, having a second input connected to the storage device and having an output, for selecting either the first stored value on the second input or the encoded first data rate on the first input to be connected to the output, and
        control signal generator means, having an input connected to the output of the selection means, for generating bus control signals which control data transfer over the bus, the control signals controlling data transfer rate over the bus;
    wherein when the selection means selects the first input, the control signal generator means generates the bus control signals such that data is transferred over the bus at the first data transfer rate and when the selection means selects the second input, the control signal generator means generates the bus control signals such that data is transferred over the bus at the second data transfer rate.

2. A computer system as in claim 1 wherein the bus controller additionally comprises:
    arbiter means, connected to the selection means, for directing the selection means as to which of the first input and the second output to select.

3. A computer system as in claim 1 wherein the storage device is additionally for storing a second stored value which indicates a second data transfer rate and the multiplexor means is also for selecting the second stored value to be coupled to the input of the control signal generator means.

4. A computer as in claim 1 wherein the computer system generates a clock signal used in data transfers over the bus and the control signal generator means generates the bus control signals such that the first data transfer rate varies from the second data transfer rate in number of clock cycles per datum transfer.

5. In a computer system which includes a bus and a plurality of devices coupled to the bus, a method comprising the steps of:
    (a) when performing a data transfer over the bus, controlled by a bus controller, to or from a first device, performing the following substeps:
        (a.1) generating addresses by a CPU within the bus controller, and
        (a.2) generating, by the bus controller, control signals which control the data transfer, a data transfer rate of the data transfer being based on a subset of address bits within an address used to address the first device, the first subset of address bits being reserved to indicate data transfer rate; and,
    (b) when performing a first DMA data transfer in a first DMA channel, performing the following substeps:
        (b.1) generating addresses for the first DMA data transfer, and
        (b.2) generating, by the bus controller, first control signals for the first DMA data transfer, a first data transfer rate for the first DMA data transfer being based on a first stored value stored in a storage device.

6. A method as in claim 5 additionally comprising the step of:
    (c) when performing a second DMA data transfer in a second DMA channel, performing the following substeps:
        (c.1) generating addresses for the second DMA data transfer; and,
        (c.2) generating, by the bus controller, second control signals for the second DMA data transfer, a second DMA data transfer rate for the second DMA data transfer being based on a second stored value in the storage device.

7. A method as in claim 6 wherein the computer system generates a clock signal used in data transfers over the bus and the data transfer rate in substep (a.2), the first data transfer rate in substep (b.2) and the second data transfer rate in substep (c.2), vary in number of clock cycles per datum transfer.

8. In a computer system which includes a bus, a bus controller and a plurality of devices coupled to the bus, a method comprising the steps of:
- (a) selecting, by the computer system, an address space for each device, including the substeps of:
  - (a.1) assigning a block of address space for each device, and
  - (a.2) dividing each block of address space into a plurality of sub-blocks, so that for an address formed of a plurality of address bits, a first subset of the plurality of address bits is used to identify a data transfer rate, and a third set of bits is used to designate a memory location within the peripheral device; and,
- (b) when performing a data transfers to and from a particular device from the plurality of devices, generating, by the bus controller, control signals for data transfers to and from the particular device, wherein the bus controller selects a data transfer rate, controlled by the control signals, for the data transfers based on a value of the second subset of the plurality of address bits for addresses used for the data transfers.

9. A method as in claim 8 wherein in step (b) the computer system generates a clock signal used in data transfers over the bus and data transfer rates for data transfer over the bus differ based on a number of clock cycles per datum transfer.

* * * * *